United States Patent
Ambrose et al.

(10) Patent No.: US 6,284,846 B1
(45) Date of Patent: *Sep. 4, 2001

(54) STABLE POWDER COATING COMPOSITIONS

(75) Inventors: Ronald R. Ambrose, Allison Park; William H Retsch, Castle Shannon; Anthony M. Chasser, Glenshaw, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,789

(22) Filed: Nov. 2, 1999

(51) Int. Cl.$^7$ .................................................. C09D 175/06
(52) U.S. Cl. ..................... 525/440; 525/124; 525/457; 525/528; 528/289; 528/307
(58) Field of Search ..................... 525/124, 440, 525/528, 289, 307; 528/289, 307

(56) References Cited

U.S. PATENT DOCUMENTS

| | | | |
|---|---|---|---|
| 3,979,477 | 9/1976 | Schmid et al. | 260/835 |
| 3,985,825 | 10/1976 | Schmid et al. | 260/835 |
| 3,991,034 | 11/1976 | Takeo et al. | 260/75 NK |
| 4,000,214 | 12/1976 | Lum et al. | 260/835 |
| 4,281,076 * | 7/1981 | Kamimura | 525/124 |
| 4,554,343 | 11/1985 | Jackson, Jr. et al. | 528/274 |
| 4,578,453 | 3/1986 | Jackson, Jr. et al. | 528/302 |
| 4,755,623 | 7/1988 | Dileone | 564/160 |
| 5,097,006 | 3/1992 | Kapilow et al. | 528/272 |
| 5,262,494 | 11/1993 | Smith et al. | 525/443 |
| 5,376,460 | 12/1994 | Hardeman et al. | 428/482 |
| 5,418,309 * | 5/1995 | Tanabe | 528/45 |
| 5,777,061 | 7/1998 | Yonek et al. | 528/45 |
| 5,786,437 | 7/1998 | Nicholas | 528/45 |
| 5,925,698 | 7/1999 | Steckel | 524/322 |
| 6,051,674 | 4/2000 | Yezrielev et al. | 528/45 |
| 6,103,826 | 8/2000 | Jones et al. | 525/123 |
| 6,111,048 | 8/2000 | Asahina et al. | 528/45 |

FOREIGN PATENT DOCUMENTS

| | | |
|---|---|---|
| 17771/95 | 11/1995 | (AU) . |
| 0 899 314 A1 | 3/1999 | (EP) . |
| 98/04608 | 2/1998 | (WO) . |
| 00/06461 | 2/1999 | (WO) . |

OTHER PUBLICATIONS

New Outdoor Durable Powder Coatings, Francesc Williams, et al., pp. B–73, B–75 –B–89, 1998.

New Developments in the Field of Blocked Isocyanates, Zeno W. Wickes, Jr., Progress in Organic Coatings, p. 20, 1981.

Liquid Crystal Block Copolyesters. 2. Preparation and Properties of Block Copolyesters Containign Cyclohexane and Benzene Rings, Polk et al. Macromolecules 1981, 14 (6), 1626–1629.

Liquid Crystal Block Copolyesters. 3. Isomerization Polymerization of Block Copolyesters Containing Cyclohexane and Benzene Rngs, Macromolecules 1984, 1 (2), 129–134.

* cited by examiner

Primary Examiner—Patricia A. Short
(74) Attorney, Agent, or Firm—William J. Uhl

(57) ABSTRACT

The invention provides powder coatings that produce consistent finishes when cured, and are stable when uncured. These powder coatings of the invention include novel film forming systems. The novel film forming system, in turn, includes a polymer component and a crosslinker component. In one embodiment, the crosslinker component is novel; and, in another embodiment, both the crosslinker and polymer components are novel. The novel crosslinker component includes a novel, polyfunctional isocyanate compound which is at least partially blocked with at least one of the following: a polyhydroxy aromatic compound, or a mixture of a polyhydroxy aromatic compound and a hydroxyfunctional ester compound. The novel polymer component which can be used when practicing certain embodiments of this invention includes a novel polyester polyol. This novel polyester polyol includes the reaction product of a cycloaliphatic component and a polyfunctional isocyanurate component.

11 Claims, No Drawings

STABLE POWDER COATING COMPOSITIONS

FIELD OF THE INVENTION

The present invention relates to powder coating compositions. Prior to being cured, these powder coating compositions possess excellent anti-caking stability. After being cured, these powder coating compositions produce consistent finishes.

BACKGROUND OF THE INVENTION

Coating compositions have long been used to provide the surface of articles with certain desired physical characteristics such as color, gloss and durability. In the past, most coating compositions relied upon a liquid carrier which evaporated after the composition was applied. Recently, however, there has been a growing trend toward reducing the Volatile Organic Compounds (VOCs) of coating compositions. One means of achieving this objective has been through the use of dry, solventless systems such as powder coating systems.

In typical powder coating systems, an electrostatic charge is often applied between the application device (e.g., the spray gun) and the item to be painted. This results in the powder coating's attraction and adherence to the desired substrate.

After being applied, the powder coating is cured. Typically, this is achieved by heating the coated substrate to an elevated temperature (e.g., a temperature between 50° C. and 400° C.). During the curing process, the powder particles melt and spread, while the components of the powder coating crosslink. In addition to not emitting any VOCs into the environment during the application or curing processes, such a powder coating system is extremely efficient since there is essentially no waste (i.e., application yield is approximately 100 percent).

Powder coating systems are well known to those skilled in the art. In the coating industry, the term "powder" includes not only materials with a relatively small particle size, but also those with larger sizes, such as granules. Typically, however, the average particle size of most power coating systems are in the range from about 0.1 to about 500 microns; and more commonly, from about 0.5 to about 100 microns.

Powder coating systems have been used commercially to impart high and low gloss finishes to surfaces. Notwithstanding the aforementioned advantages, certain problems encountered by the coating manufacturers, transporters and applicators have hindered their widespread use and acceptance.

For example, one problem often encountered is associated with the physical nature of the uncured powder. Specifically, most uncured powder coatings have an average particle size distribution ranging from about 0.5 to about 100 microns. Powders with such a particle size distribution are often unstable. The term "unstable" as used herein refers to the particles of a powder coating having a tendency to clump or "cake" when exposed to small amounts of moisture, even as low as that resulting merely from elevated humidity conditions. To avoid this phenomenon from occurring, powder coating formulators, transporters and applicators all have to take special, and often costly, handling precautions. Accordingly, coating manufacturers continually strive to formulate powder coating compositions that are more stable (i. e., powder coatings that resist caking).

Other frequently encountered problems are specific to the use of powder coating systems for the production of low gloss finishes. Historically, gloss reduction in powder coating systems has been accomplished by the implementation of a "differential reactivity" method. This method relies upon combinations of chemistries reacting at different rates to create phase separated domains within the film. These separated domains scatter the reflected light which, in turn, contribute to the film's lower gloss readings.

One problem encountered by this method to produce low gloss powders is that such phase separation is often difficult to control. Another problem encountered by this method is that it usually lowers the film's durability proportional to the amount of gloss reduction. Accordingly, a 20% light reflectance film (as measured at a 60° incidence angle) from a powder coating is not only more difficult to reproduce, but also has poorer durability than a 40% light reflectance film.

Another conventional way of producing low gloss films from powder coating systems is to add flatting agents to the formulation. Typically, the more flatting agents employed, the lower the film's gloss. However, the use of flatting agents typically comes at a cost. Specifically, while flatting agents reduce the finish's gloss, they also tend to reduce the finish's durability.

Other problems encountered when using powder coating systems pertain to the use of the same to produce consistent low gloss finishes. Specifically, even though conventional powder coating systems can be formulated to produce gloss levels below 30% light reflectance, it has been difficult for such conventional powder coatings to produce low gloss finishes where the percent of light reflectance is consistently within ±5% of the light reflectance from the desired level. Accordingly, coating manufactures continually strive to formulate powder coating compositions that produce more consistent low gloss finishes.

While coating manufacturers have been able to formulate powder coating systems which resolve some of the aforementioned problems, they continually try to identify a powder coating system that will resolve most, if not all, of those problems. In other words, if a powder coating system is formulated which can, not only produce finishes with consistent gloss levels, but also resists caking, this would be considered by those skilled in the art to be a great advancement of the current technology.

SUMMARY OF THE INVENTION

One object of the present invention is to provide powder coating compositions that, when uncured, resists caking.

Another object of the present invention is to provide powder coating compositions that, when cured, produce consistent low gloss finishes.

The achievement of these and other objects will become apparent to those skilled in the art after reading this specification. Specifically, disclosed herein are novel powder coating compositions. These novel powder coating compositions not only consistently produce curable finishes with consistent gloss levels; but also resist caking when in their uncured state.

The powder coating compositions of the present invention include novel film forming systems. The novel film forming system includes a polymer component and a novel crosslinker component. In one embodiment, the crosslinker component is novel; and in another embodiment, both the crosslinker and polymer components are novel.

The novel crosslinker component which can be used when practicing this invention includes a novel, polyfunctional isocyanate compound which is at least partially blocked with at least one of the following: a polyhydroxy aromatic compound, or a mixture of a polyhydroxy aromatic compound and a hydroxy-functional ester compound.

The novel polymer component which can be used when practicing certain embodiments of this invention includes a novel polyester polyol. This novel polyester polyol includes the reaction product of a cycloaliphatic component and a polyfunctional isocyanurate component.

DETAILED DESCRIPTION OF THE INVENTION

The powder coating compositions of the present invention include a novel film forming system. As used herein, the term "film forming resin system" includes: 1) a polymer component capable of forming a film; 2) a crosslinker component; and optionally, 3) a catalyst component, if necessary, to facilitate the reaction between the polymer component and a crosslinker component. In one embodiment of the present invention, the crosslinker component is novel; and, in another embodiment, both the crosslinker and polymer components are novel.

The film forming systems' novel crosslinker component includes a novel crosslinking agent. This novel crosslinking agent comprises a polyfunctional isocyanate which is at least partially blocked with at least one of the following: a polyhydroxy aromatic compound, or a mixture of a polyhydroxy aromatic compound and a hydroxy-functional ester compound. These blocking agents will be described below in more detail.

Any suitable polyfunctional isocyanates can be employed when practicing this invention, provided that they participate in sufficiently crosslinking the film forming resin's polymer component.

In one embodiment, the polyfunctional isocyanate is derived from a polyisocyanate (i.e., an isocyanate possessing at least two isocyanate functions, advantageously more than two) which is itself typically derive from a precondensation or from a prepolymerization of elemental isocyanates. Elemental isocyanates include those made of hydrocarbon skeletons having at least two isocyanate functions. These hydrocarbon skeletons are often an arylene radical, an alkylene radical (including an aralkylene radical) such as the polymethylenes (e.g., hexamethylene), or the necessary to form isophorone diisocyanate (IPDI). The hydrocarbon skeletons may also be alkyl(s) or arylic.

The atomic weight of these elemental isocyanates is advantageously at most 500; and preferably at most 300. Moreover, the average molecular weights of the prepolymers or precondensates is not more than 5000; and more commonly not more than 3000.

The polyisocyanates that may be used when practicing this invention include those of the biuret type and those for which the di- or trimerization reaction has produced four-, five- or six-membered rings. Among the six-membered rings, there may be mentioned the isocyanuric rings derived from a homo- or hetero- trimerization of various diisocyanates alone, with other isocyanate(s) (e.g., mono-, di- or polyisocyanate(s)) or with carbon dioxide. In this latter case, a nitrogen from the isocyanuric ring is replaced by an oxygen.

In certain preferred embodiments, the polyisocyanates which can be employed include those which have at least one aliphatic isocyanate function. In other words, at least one isocyanate function blocked in accordance with this invention is attached to the hydrocarbon skeleton via an $sp^3$-type carbon advantageously bearing at least one hydrogen atom, preferably two.

It is preferable to choose compounds according to the present invention such that they react completely with a primary alcohol. The reaction is considered to be complete if it is achieved to 80% or more.

In certain embodiments, the preferred isocyanates are those wherein the nitrogen atom is attached to an $sp^3$-hybridized carbon; and more particularly, to aliphatic isocyanates; and especially, to polymethylene diisocyanates and the various condensation derivatives thereof (biuret, etc.) and di- and trimerization derivatives thereof.

When practicing this invention, it is sometimes preferable for the percentage of residual free isocyanate function to be not more than about 10%; preferably, not more than about 5%; and more preferably, not more than about 3%. The highest melting points or glass transition temperatures are typically obtained with percentages not exceeding about 1%.

In other embodiments, the polyfunctional isocyanates comprises trimers. If the incorporation of trimers is preferred, examples of such that can be employed include: isocyanurates from isophorone diisocyanate or hexamethylene diisocyanate; and/or biurets from hexamethylene diisocyanate. In certain embodiments, the film forming resin's crosslinker component preferably comprises an isocyanurate from isophorone diisocyanate.

If employed as at least part of the film forming resin's novel crosslinker component, an isocyanurate from isophorone diisocyanate can be prepared by any suitable manner known to those skilled in the art. One example of a manner in which an isocyanurate from isophorone diisocyanate can be prepared includes the trimerization of IPDI in the presence of a suitable catalyst system. Thereafter, the remaining NCO groups are at least partially blocked as set out below.

A first reaction step of such a process (i.e., the catalytic trimerization) does not yield a uniform product. Rather, it produces various oligomers of IPDI which contain at least one isocyanurate ring and at least 3 free NCO groups. These products are hereinafter referred to as "IPDI—isocyanurates".

One example of a suitable catalyst system that can be used to trimerize the IPDI comprises 1,4-diazabicyclo(2,2,2)-octane/1,2-epoxypropane. The trimerization may be carried out with or without inert organic solvents. In some instances, it is desirable to terminate the trimerization reaction when the NCO content of the mixture reaches a certain level. For example, in some instances, it is desirable to terminate the trimerization when 30 to 50% of the NCO groups have reacted in the trimerization reaction. Under these circumstances, the unreacted IPDI can be separated from the isocyanurate by thin film distillation.

As opposed to formulating IPDI—isocyanurates in one of a number of known procedures such as the one set out above, IPDI—isocyanurates are also commercially available. For example, IPDI—isocyanurates which can be employed include the following: VESTANAT™ T-1890 isocyanurate commercially available from Creanova Corporation, and DESMODUR™ Z4470 BA isocyanurate commercially available from Bayer Corporation.

Although the film forming resin's novel crosslinker component can predominantly include diisocyanates, in certain preferred embodiments, the film forming resin's crosslinker component predominantly includes triisocyanates or a mixture of diisocyanates and triisocyanates, wherein the triisocyanate content is at least 25 percent of the total crosslinker component. In certain embodiments, if a blend of diisocyanates and triisocyanates is employed, the triisocyanate content is preferably at least about 50 percent; and more preferably at least about 75 percent of the total crosslinker component.

Although polyfunctional isocyanates are known to those skilled in the art as being able to crosslink polyester polyols used in making powder coating compositions, what is not known to skilled artisans is that these types of crosslinkers can adequately function in this manner when they are at least partially blocked in the manner set out below. Specifically, in accordance with the present invention, the polyfunctional isocyanates of the novel crosslinker component are at least partially blocked with at least one of the following: a polyhydroxy aromatic compound, or a mixture of a polyhydroxy aromatic compound and a hydroxy-functional ester compound.

As used herein, the term "polyhydroxy aromatic compound" includes compounds having at least one of the following structures:

HO—$\Phi^1$—$R^1$—$\Phi^1$—OH  (I)

where $\Phi^1$ is an aromatic-containing compound which comprises a phenyl group, and $R^1$ is an alkyl group having 0 to 4 carbon atoms, or

HO—$\Phi^2$—OH  (II)

where $\Phi^2$ is an aromatic containing compound which comprises a phenyl group or a naphthyl group.

Examples of the polyhydroxy aromatic compounds which are encompassed by structure (I) include: diphenols such as 4,4'-isopropylidenediphenol (e.g., Bisphenol™ A, commercially available from Dow Chemical Co) and bis(4-hydroxyphenyl) methane (e.g., Bisphenol™ F, also commercially available from Dow Chemical Co).

Examples of polyhydroxyl aromatic compounds which are encompassed by structure (II) include: dihydroxynaphthalene, hydroxy phenols such as resorcinol, and derivatives thereof. In certain preferred embodiments of this invention, the polyhydroxy aromatic compound comprises 4,4'-isopropylidene-diphenol.

As used herein, the term "hydroxy-functional ester compound" includes compounds having the following structure:

COOR$^2$—$\Phi^2$—OH  (III)

where, $R^2$ is an alkyl group having from 1 to 4 carbon atoms.

In structure (III), although $\Phi^2$ is an aromatic containing compound which comprises a phenyl group or a naphthyl group, in certain preferred embodiments, $\Phi^2$ is an aromatic containing compound which comprises a phenyl group.

Examples of the hydroxy-functional ester compounds which are encompassed by structure (III) include: methyl 4-hydroxy benzoate, methyl 3-hydroxy benzoate, and the like. In certain preferred embodiments of this invention, the hydroxy-functional ester compound comprises methyl 4-hydroxy benzoate.

As stated above, the polyhydroxy aromatic compounds encompassed by structures (I) and (II) can be used exclusively as blocking agents for the polyfunctional isocyanates of the novel crosslinker component. However, in certain preferred embodiments, the polyfunctional isocyanates of the novel crosslinker component are at least partially blocked with a blend of the polyhydroxy aromatic compound(s) and the hydroxy-functional ester compound(s) encompassed by the following structures: (I) and (III); (II) and (III); and/or (I), (II) and (III).

In the embodiments wherein the polyfunctional isocyanate is at least partially blocked with a blend of the polyhydroxy aromatic compound(s) and the hydroxy-functional ester compound(s), the ratio of the polyhydroxy aromatic compound(s) to the hydroxy-functional ester compound(s) typically ranges from about 0.01:1 to about 1.4:1. In certain embodiments where a blend of these blocking agents are employed, the ratio of the polyhydroxy aromatic compound(s) to the hydroxy-functional ester compound(s) preferably ranges from about 0.05:1 to about 1:1.2, and more preferably, from about 0.10:1 to about 1:1.

When at least partially blocking the polyfunctional isocyanates in accordance with certain embodiments of the present invention, the total amount of the blocking agent(s) employed are such that there exists from about 1.5 to about 0.6 hydroxyl equivalents of the blocking agent(s) per equivalent of free NCO in the polyfunctional isocyanates. In certain preferred embodiment, the total amount of the blocking agent(s) employed are such that there exists from about 1.3 to about 0.7 hydroxyl equivalents of the blocking agent(s) per equivalent of free NCO in the polyfunctional isocyanates; and more preferably, from about 1.1 to about 0.9 hydroxyl equivalents of the blocking agent(s) per equivalent of free NCO in the polyfunctional isocyanates.

Any suitable means known to those skilled in the art can be employed to at least partially block the polyfunctional isocyanates used in the novel crosslinker component of the present invention.

As stated above, the powder coatings' novel film forming system includes the aforementioned novel crosslinker component. However, in addition to the novel crosslinker component, the film forming system of these powder coatings further includes a polymer component. This polymer component can be any suitable polymer(s) which can be used to make powder coating compositions and which can be crosslinked by the novel crosslinker component. Suitable polymer components include those conventionally employed by the coating industry for use in making powder coating compositions. Suitable polymer components also include those novel polymer components which will be described below in more detail.

With regard to conventional polymer components which can be employed when practicing this invention, any suitable polymer component known to those skilled in the art capable of resulting in the formation of a powder coating composition, and capable of being crosslinked by the novel crosslinker component, can be employed. Examples of suitable polymer components which can be employed are those which include at least one of the following compounds: acrylic resins, polyester resins, polyurethane resins, epoxy resins, and the like.

Typically, however, conventional polymer components employed when practicing this invention include a polyol with at least the following characteristics:

a. a glass transition temperature ($T_g$) of at least about 25° C., preferably at least about 35° C., and more preferably, at least about 45° C.;

b. a hydroxyl index in the range from 5 to 500 mg KOH/g, preferably, in the range from 10 to 300 mg KOH/g, and more preferably, in the range from 15 to 100 mg KOH/g; and c. a mean molecular mass (Mn) in the range from 500 to 25000 g/mole, preferably, in the range from 1000 to 20000 g/mole, and more preferably, in the range from 1500 to 15000 g/mole, wherein Mn is determined by gel permeation chromatography (GPC) with polystyrene standard.

Polyols which can be employed as part of the polymer component when practicing this invention include those which comprise a cycloaliphatic component. This cycloaliphatic component includes the reaction product of at least one cycloaliphatic acid and at least one cyclic polyol. Any suitable cycloaliphatic acid can be employed. For example, the cycloaliphatic acid can be the 1,2- 1,3- and/or 1,4-isomer of hexahydrophthalic acid, the latter of which is also referred to as 1,4-cyclohexanedicarboxylic acid. In place of a dicarboxylic acid, the esters thereof with short chain alkanols (e.g., dimethyl, diethyl, or dipropyl esters) can also be used. In many instances, however, hexahydrophthalic anhydride is preferred.

The term cycloaliphatic acid also includes those alkyl cycloaliphatic acids or anhydrides where an alkyl group, having up to about seven carbon atoms, is bound to the cycloaliphatic ring. Accordingly, for the purposes of this invention, the term "cycloaliphatic acid" includes not only the examples set out above, but also the esters, anhydrides and ring-alkylated derivatives of each.

When preparing the cycloaliphatic component used in making the polyester polyol, the amount of the cycloaliphatic acid employed is typically at least about 20 weight percent. More typically, the amount of the cycloaliphatic acid employed is at least about 30 weight percent; and even more typically, at least about 40 weight percent. On the other hand, when preparing the cycloaliphatic component used in making the polyester polyol, the amount of the cycloaliphatic acid employed is typically not greater than about 75 weight percent. More typically, the amount of the cycloaliphatic acid employed is not greater than about 65 weight percent; and even more typically, not greater than about 55 weight percent. All of the aforementioned weight percentages are based upon the total weight of the resulting polyester polyol.

The cyclic polyol used in making the cycloaliphatic component can be any suitable cyclic polyol which can react with the aforementioned cycloaliphatic acid. Some examples of such suitable cyclic polyols include: cyclohexane dimethanol and cyclohexane diol. In one preferred embodiment, such a suitable cyclic polyol is cyclohexane dimethanol (CHDM).

When preparing the cycloaliphatic component used in making the polyester polyol, the amount of the cyclic polyol employed is typically at least about 10 weight percent. More typically, the amount of the cyclic polyol employed is at least about 20 weight percent; and even more typically, at least about 30 weight percent. On the other hand, when preparing the cycloaliphatic component used in making the polyester polyol, the amount of the cyclic polyol employed is typically not greater than about 70 weight percent. More typically, the amount of the cyclic polyol employed is not greater than about 60 weight percent; and even more typically, not greater than about 50 weight percent. All of the aforementioned weight percentages are based upon the total weight of the resulting polyester polyol.

When preparing the aforementioned polyester polyol, the amount of the cycloaliphatic component employed is typically at least about 60 weight percent. More typically, the amount of the cycloaliphatic component employed is at least about 70 weight percent; and even more typically, at least about 80 weight percent. On the other hand, when preparing the aforementioned polyester polyol, the amount of the cycloaliphatic component employed is typically not greater than about 99 weight percent. More typically, the amount of the cycloaliphatic component employed is not greater than about 97 weight percent; and even more typically, not greater than about 95 weight percent. All of the aforementioned weight percentages are based upon the total weight of the resulting polyester polyol.

When the polymer component comprises an acrylic resin, a single binding material is typically used. Such acrylic resins can be obtained by having the unsaturated alpha, beta monomers react in ethylene, in particular aromatic vinyl monomers and alpha, beta carboxylic acid esters unsaturated in ethylene. For example, it is possible to cite styrene and its derivatives, such as methylstyrene or chlorostyrene; in the case of exterior products, they are present in quantities comprised between 5 and 54%, preferably between 10 and 25% of the entire set of monomers. Quantities under 5% may affect corrosion resistance.

Among the alpha, beta acid esters unsaturated in ethylene, the acrylic and methacrylic acid esters such as methyl acrylate, ethyl acrylate, butyl acrylate, 2-ethylhexyl acrylate, dodecyl acrylate, methyl methacrylate, ethyl methacrylate, butyl methacrylate, 2-ethylhexyl methacrylate, lauric methacrylate should be cited. Preferably, unsaturated esters are present in a quantity between 5 and 8% and correspond to a mixture of alkyl esters with 1 to 3 carbon atoms and 4 to 20 carbon atoms, for example a mixture of methyl methacyrlate and butyl acrylate.

The hydroxyl functionality of the acrylic polymer is conferred by the copolymerization of monomers having hydroxyl groups, such as hydroxethyl methacrylate, hydroxypropyl acrylate and methacrylate in quantities between 5 and 80%, this percentage, involving the entire set of monomers, is necessary to obtain the indicated hydroxyl index.

The acrylic polymer can have a certain acidity index generally less than 15 by adding acrylic, methacrylic, itaconic or fumaric acid and/or maleic anhydride or acid.

To prepare said acrylic polymers, the various monomers are mixed and made to react by polymerization of free radicals. Among the initiators capable of being used, in particular, it is possible to cite benzoyle peroxide, tertiobutyl hydroperoxide, ditertiobytyl peroxide, azo-bis-isobutyronitirile. To regulate molecular weight, link transfer agents can be used such as mercaptopropionic, docecyl and lauric mercaptan acid. The polymerization is carried out in a solution, by using a solvent in which the monomers are soluble such as toluene, xylene, butyl acetate, propylenegycolmethylether acetate, among others. When the polymerization has been achieved, the reaction mixture is volatized under vacuum to eliminate the organic solvent and recover the solid polymer. The residual content in solvents or volatile compounds should be less than 0.5%.

When acrylic polymers are used which satisfy the above-mentioned conditions, a satisfactory cross-linking is then obtained with a prepolymer with masked isocyanate functions in accordance with the present invention with the desired matte-finish quality, but the mechanic properties remain insufficient for uses subject to adverse weather conditions. It is also preferred to use saturated and polyisocyanate polyester systems.

The acidity index of the polymer in accordance with the present invention makes it possible to make the carboxyl groups react with aliphatic, aromatic polyepoxides and/or beta-hydroxyalkylamides, and thus a double cross-linking is obtained.

With regard to the novel polymer components which can be employed when practicing certain embodiments of this invention, they include a novel polyester polyol. This novel polyester polyol includes the reaction product of a cycloaliphatic component, or the reactants making up the same, and a polyfunctional isocyanurate component.

The cycloaliphatic component of the novel polyester polyol is the same as described above. Although the novel polyester polyol can be made by reacting a polyfunctional isocyanurate component, described below in detail, with the aforementioned cycloaliphatic component, it can also be made by reacting the polyfunctional isocyanurate component with the reactants which make up the cycloaliphatic component. If this latter approach is used, the amounts of the cycloaliphatic acid and the cyclic polyol which should be employed are those amounts set out above for the respective reactants.

The polyfunctional isocyanurate component used in making the novel polyester polyol includes at least one compound that has at least two groups reactive towards carboxylic groups. Examples of compounds which can be used as the polyfunctional isocyanurate component include: tris (hydroxyethyl)isocyanurate (THEIC) and triglycidyl isocyanurate. In one preferred embodiment, the polyfunctional isocyanurate component comprises THEIC.

When preparing the polyester polyol used when practicing this invention, the amount of the polyfunctional isocyanurate component employed is typically at least about 1 weight percent. More typically, the amount of the polyfunctional isocyanurate component employed is at least about 3 weight percent; and even more typically, at least about 5 weight percent. On the other hand, when preparing the polyester polyol used when practicing this invention, the amount of the polyfunctional isocyanurate component employed is typically not greater than about 40 weight percent. More typically, the amount of the polyfunctional isocyanurate component employed is not greater than about 30 weight percent; and even more typically, not greater than about 20 weight percent. All of the aforementioned weight percentages are based upon the total weight of the resulting polyester polyol.

The polyester polyol used when practicing this invention has a hydroxyl value of at least about 5 mg KOH per gram of resin. Typically, the novel polyester polyol has a hydroxyl value of at least about 10; and more typically, of at least about 15 mg KOH per gram of resin. On the other hand, the novel polyester polyol has a hydroxyl value which is not greater than about 200 mg KOH per gram of resin. Typically, the novel polyester polyol has a hydroxyl value which is not greater than about 150; and more typically, which is not greater than about 100 mg KOH per gram of resin.

In addition to the above, the film forming system's novel polymer component can also include at least one of the following optional components: additional film forming resins such as neopentyl glycol, 1,6-hexanediol, 2-methyl propanediol, ethylene glycol, propylene glycol, diethylene glycol, butanediol, trimethyl pentanediol dipropylene glycol 2,2-dimethyl-3-hydroxypropyl-2,2,-dimethyl-3-hydroxypropionate, trimethylol propane trimethylol ethane and other additives known to those skilled in the art. It should be noted, however, that the use of optional components in the film forming system's polymer component can affect the properties of the powder coating and/or any film resulting therefrom. Therefore, the type and/or amount of optional components employed, if any, depend in part on the powder coating's desired end use.

However, if optional components are employed as part of the novel film forming system's polymer component, the total amount of these optional components should not exceed 30 weight percent. Preferably, the amount of the optional component employed should not exceed 20 weight percent; more preferably, not more than 10 weight percent; and even more preferably, not more than 5 weight percent. These weight percentages are based upon the total weight of the film forming system's polymer component.

In addition to a crosslinker component and a polymer component, it is within the scope of this invention for the novel film forming system to further include an optional catalyst component. If present, the catalyst component is typically used to increase the reaction rate between the polymer component and the crosslinker component.

When employed, the catalyst component is typically present at levels ranging from about 0.001% to about 15%. Typically, the amount of the catalyst component employed ranges from about 0.01% to about 10%; and more typically, from about 0.1% to about 5%. These percentages are based upon the total weight of the film forming resin system.

Any suitable catalyst composition(s) which can catalyze the reaction between the film forming system's polymer component and crosslinker component can be employed when practicing this invention. Examples of such suitable catalysts include: dibutyl tin dilaurate, zinc compounds such as zinc acetate, and/or amines such as triethyl amine, imidazoles, cyclic amidine, alkyl/aryl ammonium halides, and zinc alkyl/aryl thiocarbamates.

In addition to a polymer component, a crosslinker and an optional catalyst component, the novel film forming systems employed when practicing this invention can further include other optional additives known to those skilled in the art. Examples of such additives include: benzoin, waxes, plasticizers, flow control agents, and the like. It is important to note, however, that the addition of such additives will probably affect the cured and/or uncured states of the resulting powder coating composition. Accordingly, the types and amount of such additives employed, if any, depend in part upon the desired use of the powder coating composition.

In addition to the novel film forming systems described above, the powder coating compositions encompassed by the present invention can also include a pigment system. If present, such a system can be used to impart a color to and/or reduce the gloss of the resulting cured film. As used herein, the terms "pigment system" and "pigment" refer not only to color-producing pigments, but also to gloss-affecting agents which may or may not alter the color of the cured film, and/or fillers. It should be noted that, it is within the scope of this invention for the pigment system to include compositions which produce more than one of the aforementioned results. It is also within the scope of this invention for the pigment system to include only one of the aforementioned types of compositions, or any combination thereof.

If employed, the pigment system typically comprises pigments having an average minimum particle size of at least about 0.1 micron. Typically, the pigments employed have an average minimum particle size of at least 0.5 micron; more typically of at least about 1 micron; and even more typically of at least about 3 microns.

On the other hand, the pigment system, if employed, typically comprises pigments having an average maximum particle size of at most about 100 microns. Typically, the pigments employed have an average minimum particle size of at most about 75 microns; more typically of at most 50 microns; and even more typically of at most 25 microns.

If the pigment system is designed to alter the gloss of the finish among other things, any suitable gloss altering pigments can be employed. Examples of such suitable gloss altering pigments include: silicas, barytes, calcium carbonate, talcs, magnesium silicate and/or aluminum silicate. If the desired result is to lower the gloss of the resulting finish, the pigment component typically includes at least one silica.

If the pigment system is designed to alter the color of the finish among other things, any suitable color altering pigments can be employed. Examples of such suitable color altering pigments include: titanium dioxide, lithopone, zinc white, organic red lake pigment, black mixed metal oxides, red oxide, carbon black, phthalocyanine blue, aluminum powder paste, and the like.

Among the aforementioned pigments, special mention should be made of titanium dioxide. Indeed, this pigment can play a neutral role or favor the matte-finish aspect according to the chosen pre-treatment. It has appeared that the titanium oxides undergoing a silica treatment (and possibly aluminum) significantly increases the matte-finish quality, that having the most significant effect is that sold under the name TITAFRAN™ RL68. Titanium dioxides treated with zirconium oxide only have a minor effect on the matte-finish quality. However, those skilled in the art can easily vary the dull-glazed or matte characteristic by adjusting the amount of titanium dioxide employed.

If the pigment system is designed to be used as a filler among other things, any suitable filler(s) can be employed. Examples of such suitable fillers include: calcium carbonate, barium sulfate, clay, mica, talc, wollastonite, silica, alumina, alumino silicates, and the like.

When practicing certain embodiments of this invention, the amount of the pigment system employed is typically at least about 0.1 weight percent. More typically, the amount of the pigment system employed is at least about 1 weight percent; and even more typically, at least about 3 weight percent. These weight percentages are based upon the total weight of the resulting powder coating composition.

On the other hand, in those embodiments where a pigment system is employed, the amount of the pigment system is typically not greater than about 50 weight. More typically, the amount of the pigment system is typically not greater than about 40 weight percent; and even more typically, not greater than about 30 weight percent. These weight percentages are based upon the total weight of the resulting powder coating composition.

The concentration of powder coatings' film forming system will vary depending on whether or not the powder coating includes a pigment system. Typically, if a pigment system is not employed, the film forming system is typically present in an amount of at least about 70 weight percent; more typically at least about 80 weight percent; and more typically at least about 90 weight percent. On the other hand, if a pigment system is employed, the film forming system is typically present in an amount of at least about 40 weight percent; more typically, at least about 50 weight percent; and more typically, at least about 60 weight percent.

In addition to a film forming system and a pigment system, the powder coatings of the present invention can also include other additives known to those skilled in the art. For example, these powder coating compositions can include various types of additives, such as degassing leveling agents, antioxidants and UV absorbing (anti-UV) agents. They can also contain the various additives of matte-finish quality known to improve the latter quality.

Thus, benzoine can be cited as a recommended degassing agent, in particular with a quantity between 0.5 and 3% which allows volatile compounds to be released from the film during the hardening phase and makes it possible to prevent defects such as the formation of pits or small holes.

Recommended spreading additives are acrylic polymers, fluorinated polymers or polymer siloxanes, in quantities between 0.5 and 5% added directly in the master-batch in appropriate polymers or absorbed in silica. To improve the exterior performance, resistance to over curing or to hardening in direct gas injection furnaces, it is recommended that UV-absorbing and/or phenolic-type primary and/or secondary antioxidants or alkyl/aryl phosphite compositions be added to the formulations. Said additives can be present in the formulation in a quantity between 0.5 and 2% of the entire paint.

To reduce the hardening (or cross-linking) temperature, it is possible to add to the formulation the urethane catalysts such as DBTDL (stannous dibutyldilaurate), added directly in the pre-mixing] or as far as master batch.

When preparing the powder coating compositions of the present invention, the aforementioned components can be combined in any suitable manner known to those skilled in the art. For example, for powder coating compositions which contain a pigment system, one possible means of formulating such a composition includes the preparation of the polyester component. Thereafter, mixing the pigment system with the polyester. Thereafter, adding the crosslinking component, the optional catalyst component, as well as any other desired additives.

The powder coating compositions of this invention can be applied to any suitable substrate: Examples of suitable substrates include: metal, coated metal, paper, leather, cloth, plastics, and the like. Although the powder coating compositions prepared in accordance with this invention can be applied over any of the aforementioned substrates by any suitable means known to those skilled in the art, their properties make them especially useful for application over metal by electrostatic spraying. Specifically, the coating compositions of the present invention are especially useful for coating metal such as aluminum, steel, tin plated steel, electrogalvanized steel, zinc-aluminum coated steel, zinc-nickel coated steel, hot dipped galvanized steel, and electrodeposition primed versions of the above. If applied over such metal, the substrates are usually cleaned, chemically treated and/or primed to improve the adhesion of subsequent coating compositions prepared in accordance with the present invention.

Coating thickness will vary depending upon the application desired. Typically, the coatings of the present invention will be applied over substrates at coating thicknesses ranging from about 0.05 to about 150 mils; more typically, from about 0.1 to 100 mils; and even more typically, from about 1 to about 50 mils.

After application of the powder coating composition onto the desired substrate, the coatings are cured. Curing is usually conducted by subjecting the coated substrate to elevated temperatures. Typically, the elevated temperatures employed range from about 30° C. to about 400° C., and more typically from about 50° C. to about 200° C. Higher curing temperatures with correspondingly shorten curing times. The preferred curing process depends upon the nature of the substrate as well as the particular components used in formulating the coating compositions.

The combination of these and other inherent properties of the powder coating compositions of the present invention make them useful for a wide variety of applications. For example, they are especially useful for coating metal used in the manufacture of automotive trim parts, architectural panels, playground equipment, metal office furniture, vending machines and appliances.

EXAMPLES

Having generally described this invention, a further understanding can be obtained by reference to certain specific examples which are provided herein for purposes of illustration only. These examples are not intended to unduly limit the scope of the claimed invention.

Unless otherwise stated, the IPDI—isocyanurate employed in the examples was VESTANAT™ T-1890 isocyanurate commercially available from Creanova Corporation.

Example 1

Preparation of Crosslinker Components

This Example demonstrates the preparation of crosslinker components made in accordance with the present invention.

Preparation of Crosslinker A

A blocked isocyanate was prepared by mixing 1.7 moles of the IPDI trimer with 4.0 moles methyl p-hydroxybenzoate and 0.7 moles Bisphenol A. These materials were mixed as an 80% solids solution in butyl acetate and in the presence of 0.04 wt. % of dibutyl tin dilaurate. The mixing was carried out at 90° C. under a nitrogen atmosphere. The solvent was removed by distillation under reduced pressure to yield the desired product hereinafter referred to as "Crosslinker A".

Preparation of Crosslinker B

A blocked isocyanate was prepared by mixing 2.4 moles of the HDI isocyanurate (commercially available as DESMODUR™ N-3300) with 4.8 moles methyl p-hydroxybenzoate and 1.4 moles Bisphenol A. These materials were mixed as a 70% solids solution in butyl acetate and in the presence of 0.04 wt. % of dibutyl tin dilaurate. The mixing was carried out at 90° C. under a nitrogen atmosphere. The solvent was removed by distillation under reduced pressure to yield the desired product hereinafter referred to as "Crosslinker B".

Preparation of Crosslinker C

A blocked isocyanate was prepared by mixing 1.0 moles of the HDI Biuret (commercially available as DESMODUR™ N-100) with 2.3 moles methyl p-hydroxybenzoate and 0.4 moles Bisphenol A. These materials were mixed as an 70% solids solution in butyl acetate and in the presence of 0.04 wt. % of dibutyl tin dilaurate. The mixing was carried out at 90° C. under a nitrogen atmosphere. The solvent was removed by distillation under reduced pressure to yield the desired product hereinafter referred to as "Crosslinker C".

Example 2

Preparation of Polymer Components

This Example demonstrates the preparation of polymer components which can be used when practicing the present invention. One polymer component includes a novel polyester polyol (hereinafter referred to as "Polymer A"), another polymer component includes a conventional polyester polyol (hereinafter referred to as "Polymer B"). and yet another polymer component includes a conventional acrylic (hereinafter referred to as "Polymer C"). Polymer C is a hydroxyfunctional acrylic commercially available from S.C. Johnson under the tradename SCX-804.

Preparation of Polymer A

The following compounds were placed into a 5-liter flask equipped with a stirrer, thermometer, nitrogen inlet tube, and distillation column:

| COMPOUND | AMOUNT (grams) |
| --- | --- |
| 1,4-Cyclohexanedimethanol | 1048 |
| Tris(2-hydroxyethyl)isocyanurate | 254 |
| Hexahydrophthalic anhydride | 1240 |
| Dibutyl tin oxide | 2.4 |
| Triisodecylphosphite | 2.4 |

A nitrogen stream was passed over the top of the compounds while the temperature was raised to about 230° C. After the compounds had melted, the nitrogen stream was placed below the surface of the mixture. The mixture was held at about 230° C. for about 18 hours. During this period, the water of condensation was removed from the mixture through the distillation column.

After the 18-hour period, the reactor's contents were poured onto metal trays and allowed to cool to room temperature. When cooled, the contents formed a hard, brittle polyester resin. This resin is hereinafter referred to as "Polymer A".

Polymer A had the following properties: an acid value of 3.0, a hydroxyl value of 33.4, a solids content of 99.7%, and a melt viscosity of 6273 cps. The percent solids was determined by placing a sample of the resin in a weighing dish and heating in an oven to about 150° C. and maintaining the oven at that temperature for about 2 hours. The melt viscosity was determined by using a Brookfield CAP 2000 viscometer with cone #5 run at 175° C. and 200 RPM.

Preparation of Polymer B

The following compounds were place into a 5-liter flask equipped with a stirrer, thermometer, nitrogen inlet tube, and distillation column:

| COMPOUND | AMOUNT (grams) |
| --- | --- |
| 1,4-Cyclohexanedimethanol | 1183 |
| Tris(2-hydroxyethyl)isocyanurate | 135 |
| Isophthalic acid | 1379 |
| Dibutyl tin oxide | 2.4 |
| Triisodecylphosphite | 2.4 |

A nitrogen stream was passed over the top of the compounds while the temperature was raised to about 230° C. After the compounds had melted, the nitrogen stream was placed below the surface of the mixture. The mixture was held at about 230° C. for about 11 hours. During this period, the water of condensation was removed from the mixture through the distillation column.

After about 11 hours, the reactor's contents were poured onto metal trays and allowed to cool to room temperature. When cooled, the contents formed a hard, brittle polyester resin. This resin is hereinafter referred to as "Polymer B".

Polymer B had the following properties: an acid value of 4.3, a hydroxyl value of 34.8, a solids content of 99.8%, and a melt viscosity of 11,417 cps. The percent solids was determined by placing a sample of the resin in a weighing dish and heating in an oven to about 150° C. and maintaining the oven at that temperature for about 2 hours. The melt viscosity was determined by using a Brookfield CAP 2000 viscometer with cone #6 run at 200° C. and 200 RPM.

Example 3

Production of Powder Coating Compositions

This Example demonstrates the preparation of several powder coating compositions. The following compounds were place into four separate 5-liter flasks, each being equipped with a stirrer, thermometer, nitrogen inlet tube, and distillation column:

| COMPONENT | Powder A Amount (grams) | Powder B Amount (grams) | Powder C Amount (grams) | Powder D Amount (grams) | Powder E Amount (grams) | Powder F Amount (grams) |
| --- | --- | --- | --- | --- | --- | --- |
| Crosslinker A | — | 71 | 71 | — | | |
| Crosslinker B | 71 | — | — | 71 | 71 | |
| Crosslinker C | | | | | | 71 |
| Polymer A | 336 | 336 | — | — | | 336 |
| Polymer B | | | | | 336 | |
| Polymer C | — | — | 260 | 260 | | |
| Flow additive[1] | 4 | 4 | 4 | 4 | 4 | 4 |
| Degassing agent[2] | 4 | 4 | 4 | 4 | 4 | 4 |
| Carbon black pigment | 6 | 6 | 6 | 6 | — | 6 |
| Calcium carbonate flattener | 180 | 180 | 180 | 180 | — | 180 |

[1]A conventional acrylic flow additive commercially available from Solutia under the tradename PL 200 ™.
[2]A conventional degassing agent commercially available from SNIA UK under the tradename BENZOIN ™.

Powders A–F were all prepared in essentially the same manner. Specifically, all materials were weighed out and ground to a sand-like consistency with a PRISM™ high speed mixer. The ground material was then extruded on a 19 mm BAKER-PERKINS™ extruder at 100° C. After the extrudate was permitted to cool, it was ground to an average particle size of about 30 microns on a HOSAKAWA™ ACM 1 grinder.

Example 5

Performance Results of Powder Coatings

This Example demonstrates the results of testing and evaluating Powders A–F. One test was the determination of the cured film's percent of light reflectance (i.e., gloss) at a 20° incident angle and at a 60° incident angle. Another test was the film's level of cure.

In this Example, Powders A–F were all applied to a metal substrate, cured and tested in essentially the same manners. Specifically, Powders A–F were individually applied to separate metal substrates by electrostatic spray application at 80 kV with a NORDSON™ II Versa spray system to a thickness of 2.5 mil. After being applied, the coatings were all cured at 380° F. for about 20 minutes. Finally, the resulting films' gloss and durability were evaluated as set out above. The results of the evaluation are set out in the following table.

| PROPERTY | PARAMETER | RESULTING FILM FROM POWDER: A | B | C | D | E | F |
| --- | --- | --- | --- | --- | --- | --- | --- |
| Gloss Level | Percent light reflectance (20°/60°) | 3/20 | 4/30 | 4/30 | 3/19 | 6/36 | 3/19 |
| Cure Level[1] | MEK Rubs | +200 | +200 | +200 | +200 | +200 | +200 |

[1]Cure level is determined by the film can withstand at least 200 rubs with a methyl ethyl ketone (MEK) solvent in accordance with ASTM D5402-93.

The above table demonstrates the utility of this invention. All powders are fully cured as evidenced by the MEK double rubs. Moreover, as can be seen from the above tables (examples 3 and 5), it is obvious that the invention is not specific for merely hydroxy terminated polyesters as acrylics polyols work equally well.

Having now fully described this invention, it will be apparent to one of ordinary skill in the art that many changes and modifications can be made thereto without departing from the spirit or scope of the invention as set forth herein.

That which is:

1. A powder coating composition comprising a film forming resin system, wherein said film forming resin system comprises:
   a. a crosslinker component comprising a polyfunctional isocyanate which is at least partially blocked with a mixture of the following:
      i. a polyhydroxy aromatic compound comprising at least one compound having at least one of the following structures:

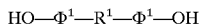

where $\Phi^1$ consists of a phenylene group, and $R^1$ is an alkylene group having 0 to 4 carbon atoms, or

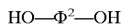

where $\Phi^2$ consists of a phenylene group or a naphthylene group, and
      ii. a hydroxy-functional ester compound having the following structure:

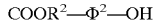

where $R^2$ is an alkyl group having from 1 to 4 carbon atoms, and $\Phi^2$ consists of a phenylene group or a naphthylene group, wherein the ratio of polyhydroxy aromatic compound to the hydroxy-functional ester compound ranges from 0.01:1 to 1.4:1, and
   b. a polymer component comprising a polyester polyol which comprises a cycloaliphatic component, said cycloaliphatic component comprising the reaction product of:
      i. a cycloaliphatic acid comprising at least one compound selected from the group consisting of: the 1,2-isomer of hexahydrophthalic acid; the 1,3-isomer of hexahydrophthalic acid; and the 1,4-isomer of hexahydrophthalic acid, and
      ii. a cyclic polyol comprising at least one compound selected from the group consisting of: cyclohexane dimethanol and cyclohexane diol.

2. A powder coating composition comprising a film forming resin system, wherein said film forming resin system comprises:

a. a crosslinker component capable of crosslinking a polymeric polyol, said crosslinker component comprising a polyfunctional isocyanate which is at least partially blocked with a mixture of a polyhydroxy aromatic compound and a hydroxy-functional ester compound, wherein the ratio of polyhydroxy aromatic compound to the hydroxy-functional ester compound ranges from 0.01:1 to 1.4:1, and wherein the polyhydroxy aromatic compound has at least one of the following structures:

$$HO-\Phi^1-R^1-\Phi^1-OH$$

where $\Phi^1$ consists of a phenylene group, and $R^1$ is an alkylene group having 0 to 4 carbon atoms, or $$HO-\Phi^2-OH$$

where $\Phi^2$ consists of a phenylene group or a naphthylene group, and wherein the hydroxy-functional ester compound has the structure:

$$COOR^2-\Phi^2-OH$$

where $R^2$ is an alkyl group having 0 to 4 carbon atoms and $\Phi^2$ consists of a phenylene group or a naphthylene group; and b. a polymeric polyol component comprising a polyester polyol, said polyester polyol comprising a cycloaliphatic component, wherein the cycloaliphatic component comprises the reaction product of:
   i. a cycloaliphatic acid, and
   ii. a cyclic polyol.

3. The powder coating composition recited in claim 2, wherein the cycloaliphatic acid comprises at least one compound selected from the group consisting of: the 1,2-isomer of hexahydrophthalic acid; the 1,3-isomer of hexahydrophthalic acid; and the 1,4-isomer of hexahydrophthalic acid.

4. The powder coating composition recited in claim 2, wherein the cycloaliphatic acid comprises hexahydrophthalic anhydride.

5. The powder coating composition recited in claim 2, wherein the amount of the cycloaliphatic acid employed is at least about 40 weight percent, said weight percentage being based upon the total weight of the polyester polyol.

6. The powder coating composition recited in claim 2, wherein the amount of the cycloaliphatic acid employed is at most about 55 weight percent, said weight percentage being based upon the total weight of the polyester polyol.

7. The powder coating composition recited in claim 2, wherein the cyclic polyol comprises at least one compound selected from the group consisting of: cyclohexane dimethanol and cyclohexane diol.

8. The powder coating composition recited in claim 2, wherein the amount of the cyclic polyol employed is at least about 10 weight percent, said weight percentage being based upon the total weight of the polyester polyol.

9. The powder coating composition recited in claim 2, wherein the amount of the cyclic polyol employed is at most about 70 weight percent, said weight percentage being based upon the total weight of the polyester polyol.

10. The powder coating composition recited in claim 2, wherein the amount of the cycloaliphatic component employed is at least about 60 weight percent, said weight percentage being based upon the total weight of the polyester polyol.

11. The powder coating composition recited in claim 2, wherein the amount of the cycloaliphatic component employed is at most about 99 weight percent, said weight percentage being based upon the total weight of the polyester polyol.

* * * * *